United States Patent
Hassan-Ali et al.

(10) Patent No.: US 9,711,272 B2
(45) Date of Patent: Jul. 18, 2017

(54) PRINTED CIRCUIT FOR WIRELESS POWER TRANSFER

(71) Applicant: Tyco Electronics Corporation, Berwyn, PA (US)

(72) Inventors: Mudhafar Hassan-Ali, Menlo Park, CA (US); Jason Larson, San Lorenzo, CA (US)

(73) Assignee: TE Connectivity Corporation, Berwyn, PA (US)

( * ) Notice: Subject to any disclaimer, the term of this patent is extended or adjusted under 35 U.S.C. 154(b) by 187 days.

(21) Appl. No.: 14/795,414

(22) Filed: Jul. 9, 2015

(65) Prior Publication Data

US 2017/0011837 A1  Jan. 12, 2017

(51) Int. Cl.
| | | |
|---|---|---|
| H02J 7/00 | (2006.01) | |
| H01F 27/28 | (2006.01) | |
| H01F 5/00 | (2006.01) | |
| H01F 27/42 | (2006.01) | |
| H01F 38/14 | (2006.01) | |
| H02J 5/00 | (2016.01) | |
| H02J 7/02 | (2016.01) | |

(52) U.S. Cl.
CPC ......... *H01F 27/2804* (2013.01); *H01F 38/14* (2013.01); *H02J 5/005* (2013.01); *H02J 7/025* (2013.01); *H01F 2027/2809* (2013.01)

(58) Field of Classification Search
CPC .... H01F 27/2804; H04B 5/0037; H02J 7/025; H02J 5/005
USPC .......................... 320/108; 307/104; 336/232
See application file for complete search history.

(56) References Cited

U.S. PATENT DOCUMENTS

| | | | | |
|---|---|---|---|---|
| 6,791,447 B2 * | 9/2004 | Scheible | ................. | H01F 38/14 336/170 |
| 7,248,017 B2 * | 7/2007 | Cheng | ..................... | H01F 38/14 320/108 |
| 7,414,380 B2 * | 8/2008 | Tang | ........................ | H02J 7/025 320/108 |
| 7,920,039 B2 * | 4/2011 | Shabany | ................. | H01F 27/22 336/200 |
| 8,358,193 B2 * | 1/2013 | Dalmia | ................... | H01F 5/003 336/229 |
| 8,400,248 B2 * | 3/2013 | Kim | ..................... | H04B 5/0037 336/200 |

(Continued)

FOREIGN PATENT DOCUMENTS

| | | |
|---|---|---|
| WO | 2013/187777 A2 | 12/2013 |
| WO | 2014/070026 A1 | 5/2014 |

*Primary Examiner* — M'Baye Diao

(57) ABSTRACT

Printed circuit includes a substrate body having a plurality of substrate layers stacked along a Z-axis. Each substrate layer is substantially planar and extends along an XY plane. The X-, Y-, and Z-axes are mutually perpendicular. The printed circuit also includes a Z-field coil that is coupled to the substrate body and has a conductive trace that is parallel to the XY plane. The printed circuit also includes an X-field coil having conductive trace segments that are coupled to the substrate body and parallel to the XY plane. The X-field coil includes conductive paths that extend substantially parallel to the Z-axis. The conductive paths interconnect the trace segments. The Z-field coil and the X-field coil are configured to generate respective vector components of a magnetic field or have a voltage induced therein by a magnetic field.

20 Claims, 4 Drawing Sheets

(56) References Cited

U.S. PATENT DOCUMENTS

| | | | |
|---|---|---|---|
| 8,436,780 B2* | 5/2013 | Schantz | G01S 5/14 |
| | | | 343/788 |
| 9,230,732 B2* | 1/2016 | Muratov | H01F 38/14 |
| 2013/0300205 A1 | 11/2013 | Tzanidis et al. | |
| 2014/0225562 A1 | 8/2014 | Li et al. | |
| 2014/0253275 A1 | 9/2014 | Shijo et al. | |
| 2016/0126007 A1* | 5/2016 | Leipold | H01F 27/2804 |
| | | | 336/200 |
| 2016/0231364 A1* | 8/2016 | Nejatali | G01R 19/0092 |

* cited by examiner

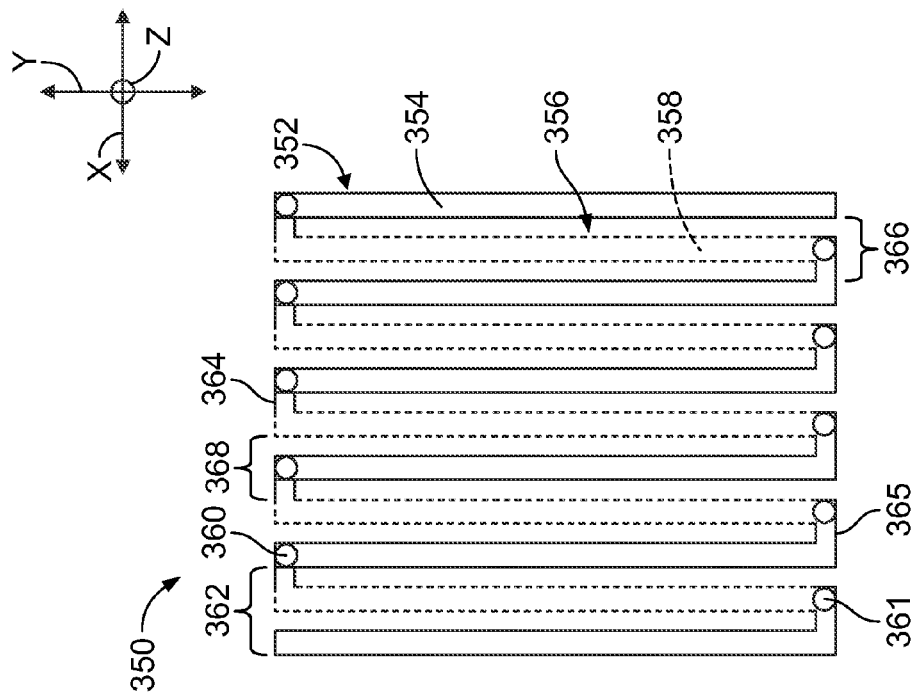
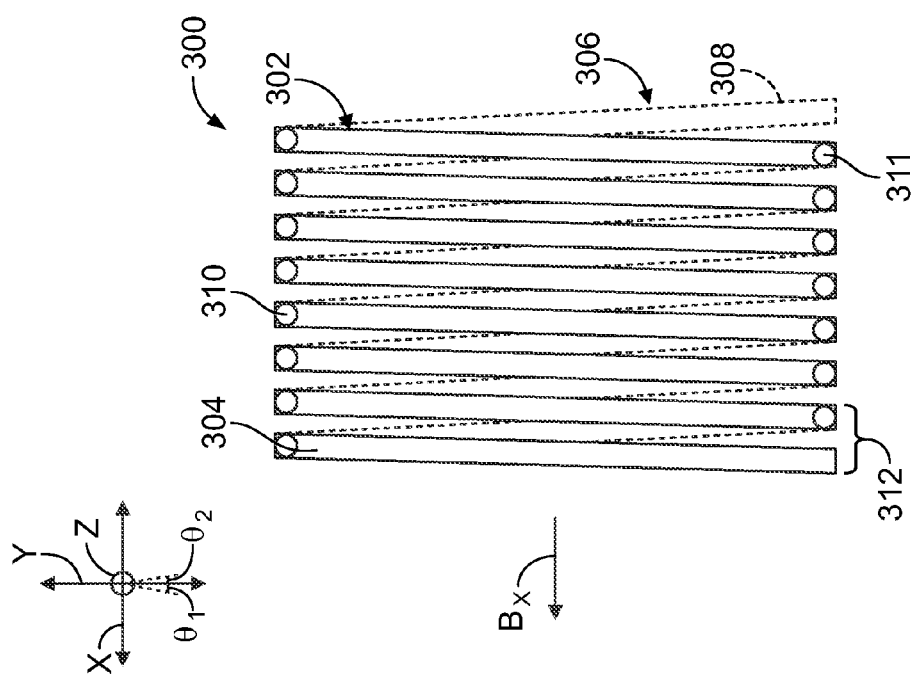

PRINTED CIRCUIT FOR WIRELESS POWER TRANSFER

BACKGROUND

The subject matter herein relates generally to wireless power transfer through inductive coupling.

Wireless power transfer, in which electrical power is transferred from one device to another device without using interconnecting wires, provides a convenient and safe method for charging devices. In light of the advantages, there is a general market trend toward manufacturing devices that are configured for wireless power transfer (also referred to as wireless energy transfer). A conventional wireless power transfer system typically includes a power transmitter having one or more planar coils and a receiving device that also includes one or more planar coils. The receiving device may be, for example, a phone, a watch, an electric toothbrush, an implantable medical device, or a radio-frequency identification (RFID) tag. Although many devices that are configured for charging through wireless power transfer are small, larger and less portable devices may also be charged through wireless power transfer. For example, electric vehicles, such as cars and trains, may be charged.

Each of the planar coils includes an electrical conductor that is wound a number of times in a spiral-like manner such that each of the windings resides within a common coil plane. When an alternating current (AC) flows through the planar coil of the power transmitter, the current generates a magnetic field that induces an alternating voltage within the planar coil of the receiving device that creates an alternating current (AC) within the planar coil. The receiving device may convert the AC in the corresponding planar coil into direct current (DC) and supply the electrical power to a load (e.g., battery) of the receiving device. In order to efficiently transfer power, the planar coils are positioned adjacent to each other and oriented such that the coil planes extend parallel to one another. The efficiency of the power transfer may be enhanced through resonant inductive coupling.

One drawback with conventional wireless power transfer systems is that the receiving device has limited spatial freedom during the charging operation. More specifically, the planar coils of the power transmitter and the receiving device must extend essentially parallel to each other during the charging operation. If the planar coil of the receiving device is not properly oriented with respect to the planar coil of the power transmitter, the efficiency of the power transfer may be significantly reduced. Although some power transmitters may be capable of holding a receiving device at a designated orientation, other power transmitters, such as charging pads capable of charging multiple devices, do not.

Accordingly, there is a need for a wireless power transfer system that is capable of adequately transferring power while allowing greater spatial freedom than conventional wireless power transfer systems.

BRIEF DESCRIPTION

In an embodiment, a printed circuit is provided that includes a substrate body having a plurality of substrate layers stacked along a Z-axis. Each substrate layer is substantially planar and extends along an XY plane. The X-, Y-, and Z-axes are mutually perpendicular. The printed circuit also includes a Z-field coil that is coupled to the substrate body and has a conductive trace that is parallel to the XY plane. The printed circuit also includes an X-field coil having conductive trace segments that are coupled to the substrate body and parallel to the XY plane. The X-field coil includes conductive paths that extend substantially parallel to the Z-axis. The conductive paths interconnect the trace segments to form the X-field coil. The Z-field coil and the X-field coil are configured to generate respective vector components of a magnetic field or have respective voltages induced therein by a magnetic field.

Optionally, the printed circuit also includes a Y-field coil having conductive trace segments that are coupled to the substrate body and parallel to the XY plane. The Y-field coil may include conductive paths that extend substantially parallel to the Z-axis. The conductive paths interconnect the trace segments to form the Y-field coil. The Y-field coil may be configured to generate a respective vector component of the corresponding magnetic field or have a voltage induced therein by the corresponding magnetic field. Optionally, the printed circuit includes one or more flexible layers.

In an embodiment, a receiving device is provided that includes a device housing and a load coupled to the device housing that is configured to receive electrical power. The receiving device also includes a printed circuit that is coupled to the device housing and configured to provide the electrical power to the load. The printed circuit includes a substrate body having a plurality of substrate layers stacked along a Z-axis. Each substrate layer is substantially planar and extends along an XY plane. The X-, Y-, and Z-axes are mutually perpendicular. The printed circuit also includes a Z-field coil that is coupled to the substrate body and has a conductive trace that is parallel to the XY plane. The printed circuit also includes an X-field coil having conductive trace segments that are coupled to the substrate body and parallel to the XY plane. The X-field coil includes conductive paths that extend substantially parallel to the Z-axis. The conductive paths interconnect the trace segments to form the X-field coil. The Z-field coil and the X-field coil are configured to have voltages induced therein by a magnetic field for generating the electrical power.

In an embodiment, a base station is provided that includes a station housing having a charging surface and a printed circuit that is positioned proximate to the charging surface. The printed circuit includes a substrate body having a plurality of substrate layers stacked along a Z-axis. Each substrate layer is substantially planar and extends along an XY plane. The X-, Y-, and Z-axes are mutually perpendicular. The printed circuit also includes a Z-field coil that is coupled to the substrate body and has a conductive trace that is parallel to the XY plane. The printed circuit also includes an X-field coil having conductive trace segments that are coupled to the substrate body and parallel to the XY plane. The X-field coil includes conductive paths that extend substantially parallel to the Z-axis. The conductive paths interconnect the trace segments to form the X-field coil. The Z-field coil and the X-field coil are configured to generate respective vector components of a magnetic field for generating electrical power in a receiving device.

BRIEF DESCRIPTION OF THE DRAWINGS

FIG. 3 is an isolated plan view of a field coil in accordance with an embodiment that may be used with the printed circuit of FIG. 2.

FIG. 4 is an isolated plan view of a field coil in accordance with an embodiment that may be used with the printed circuit of FIG. 2.

DETAILED DESCRIPTION

Embodiments set forth herein include apparatuses having a printed circuit with one or more multi-directional coil assemblies. The multi-directional coil assemblies may be capable of generating a magnetic field for transferring power wirelessly or be capable of having voltages induced therein by a magnetic field. The multi-directional coil assemblies described herein include at least two field coils that are oriented orthogonal or perpendicular to each other. In particular embodiments, the multi-directional coil assemblies are three-dimensional (3D) coil assemblies having three field coils that are mutually perpendicular to one another. A field coil includes one or more windings or turns that are formed from one or more conductive elements of the printed circuit, such as conductive traces and/or conductive paths.

A magnetic field may be represented by a vector or function having X-, Y-, and Z-components. For transmitting or receiving a magnetic field, conventional planar coils are limited, in a practical sense, to only one of the three components. For the multi-directional coil assemblies described herein, however, each field coil is configured to generate a respective vector component of a composite magnetic field or, alternatively, have a voltage induced therein by a respective vector component of a composite magnetic field. The composite magnetic field is hereinafter referred to simply as a magnetic field. For example, a Z-field coil may generate a respective vector component (Z-component) of the magnetic field, and an X-field coil may generate a respective vector component (X-component) of the magnetic field. It should be understood that one field coil may contribute a small or nominal portion of the vector component that is generated by another field coil. For example, the Z-field coil may contribute a nominal portion to the X-component of the magnetic field. Nonetheless, the X-field coil provides a majority or nearly the entire value of the X-component.

Figure 1:
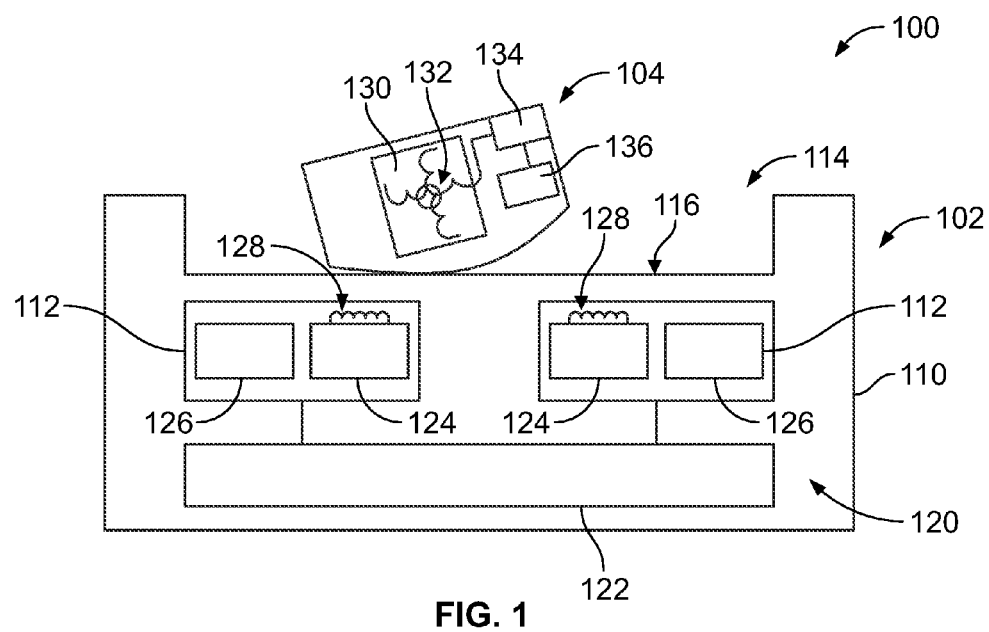
FIG. 1 is a schematic diagram of a wireless power transfer (WPT) system formed in accordance with an embodiment.

FIG. 1 is a schematic diagram of a wireless power transfer (WPT) system 100 formed in accordance with an embodiment. The WPT system 100 includes a power transmitter 102 and a power receiver 104. The power receiver 104 may be any device that is capable of receiving power (i.e., charging) through wireless power transfer. For example, the power receiver 104 may be a phone (e.g., smartphone), a computer (e.g., tablet, laptop, or notebook computer), a watch (e.g., smartwatch) or other wearable device, an electric toothbrush, an implantable medical device, or a radio-frequency identification (RFID) tag. In some embodiments, the power transmitter 102 is configured to be stationary and the power receiver 104 is configured to be positioned adjacent to and/or mounted on the power transmitter 102. For example, a watch or a phone may be positioned onto the power transmitter 102. In other embodiments, however, the power transmitter 102 may be positioned adjacent to the power receiver 104. For example, the power transmitter 102 may be positioned against a patient's body and aligned with an implanted medical device that is within the patient's body.

The power transmitter 102 includes a transmitter housing 110 and at least one WPT unit 112 that is coupled to the transmitter housing 110. In the illustrated embodiment, the power transmitter 102 includes two WPT units 112, but the power transmitter 102 may include only one WPT unit 112 or more than two WPT units 112 in other embodiments. Each of the WPT units 112 is configured to generate a magnetic field for wireless power transfer. The WPT units 112 may operate in concert with each other or may operate independently from each other. As shown, the transmitter housing 110 defines a device-receiving space 114 that is sized and shaped to receive the power receiver 104. The device-receiving space 114 is partially defined by a charging surface 116 of the transmitter housing 110. In the illustrated embodiment, the power receiver 104 is configured to rest upon the charging surface 116. Although only one power receiver 104 is shown in FIG. 1, the charging surface 116 may be configured to simultaneously hold more than one power receiver 104. Moreover, the power transmitter 102 may be configured to charge more than one type of power receiver 104. For example, a smartphone and a smartwatch may be simultaneously charged.

The power transmitter 102 includes control circuitry 120 that is configured to control operation of the power transmitter 102 for transferring power wirelessly to the power receiver 104. The control circuitry 120 includes the WPT units 112 and a system controller 122 that is communicatively coupled to each of the WPT units 112. Each of the WPT units 112 includes a power conversion unit 124 and a communications/control unit 126. Each power conversion unit 124 also includes a coil assembly 128. Each power conversion unit 124 may include, for example, an inverter and current/voltage detector that are operably coupled to the corresponding coil assembly 128. In some embodiments, the coil assemblies 128 are conventional planar coils. However, other types of coil assemblies may be used in other embodiments. For example, the coil assemblies 128 may include the multi-directional coil assemblies described herein.

In some embodiments, the power conversion unit 124 constitutes an analog portion of the WPT unit 112. The inverter of the power conversion unit 124 may convert a DC input to an AC waveform that drives the coil assembly 128. The current/voltage detector may monitor the current/voltage of the coil assembly 128. The communications/control unit 126 constitutes the digital logic portion of the WPT unit 112. The communications/control unit 126 may receive and decode messages from the power receiver 104, execute relevant power control algorithms and protocols, and drive the frequency of the AC waveform to control the wireless power transfer. The communications/control unit 126 may also interface with other subsystems of the power transmitter 102. In other embodiments, the system controller 122 may also communicate with the power receiver 104 and/or at least partially control the wireless power transfer.

In the illustrated embodiment, the power receiver 104 includes a printed circuit 130 having a multi-directional coil assembly 132 that is capable of having voltages induced within the multi-directional coil assembly 132 by a magnetic field that is generated by the power transmitter 102. The printed circuit 130 may be similar or identical to the printed circuit 200 (shown in FIG. 2). The power receiver 104 may also include control circuitry 134 that is similar the control circuitry 120. The power receiver 104 may also include a load 136, such as a battery, that is configured to be charged through WPT.

During operation, the power transmitter 102 and the power receiver 104 may communicate with each other to control a charging operation in which the power transmitter 102 generates a magnetic field for inducing a voltages in the coil assembly 132 that create alternating currents (ACs) in the coil assembly 132. The communication between the power transmitter 102 and the power receiver 104 may be in accordance with known protocols, such as the Qi™ protocol or the Rezence™ protocol, or in accordance with other proprietary protocols. The communication between the power transmitter 102 and the power receiver 104 may be through the coil assemblies 128, 132 and/or through other communication protocols.

Communication between the power transmitter 102 and the power receiver 104 may include a number phases. For example, the communication may include a selection phase, a ping phase, an identification-and-configuration phase, and a power-transfer phase. During the selection phase, the power transmitter 102 attempts to discover and locate objects that are placed on the charging surface 116. The power transmitter 102 may also attempt to discriminate between a power receiver 104 and other foreign objects and to select one or more of the power receivers 104 for power transfer. After selecting one or more of the power receivers 104, the power transmitter 102 may proceed to the ping phase and collect information regarding the power receiver (s) 104. If the power transmitter 102 does not identify a suitable power receiver 104, the power transmitter 102 may enter a low power stand-by mode of operation.

During the identification-and-configuration phase, the power transmitter 102 prepares for power transfer to the power receiver 104. For this purpose, the power transmitter 102 may retrieve relevant information from the power receiver 104. For example, the power receiver 104 may communicate a charge status that indicates a power level of the power receiver 104. The power transmitter 102 may combine this information with information that it stores internally to construct a power transfer protocol, which comprises various limits on the power transfer. During the power transfer phase, the power transmitter 102 and the power receiver 104 cooperate to regulate the transferred power to the desired level. For example, the power receiver 104 may communicate its power needs at periodic intervals, and the power transmitter 102 may continuously monitor the power transfer to ensure that the limits defined by the power transfer protocol are not violated. If a violation occurs, the power transmitter 102 may abort the power transfer. At some point, the power receiver 104 may indicate that charging is complete and the power transmitter 102 may return to the stand-by mode.

The charging operation described above may be based, in part, on an orientation of the power receiver 104. As described herein, the multi-directional coil assembly 132 has a plurality of field coils. Each field coil may be capable of coupling with the coil assembly 128. A strength of this coupling may be determined by the orientation of the field coil with respect to the coil assembly. More specifically, one field coil may have a stronger coupling with the coil assembly 128 than the other field coil(s). The charging operation may be configured to favor one or more of the field coils over another field coil.

Figure 2:
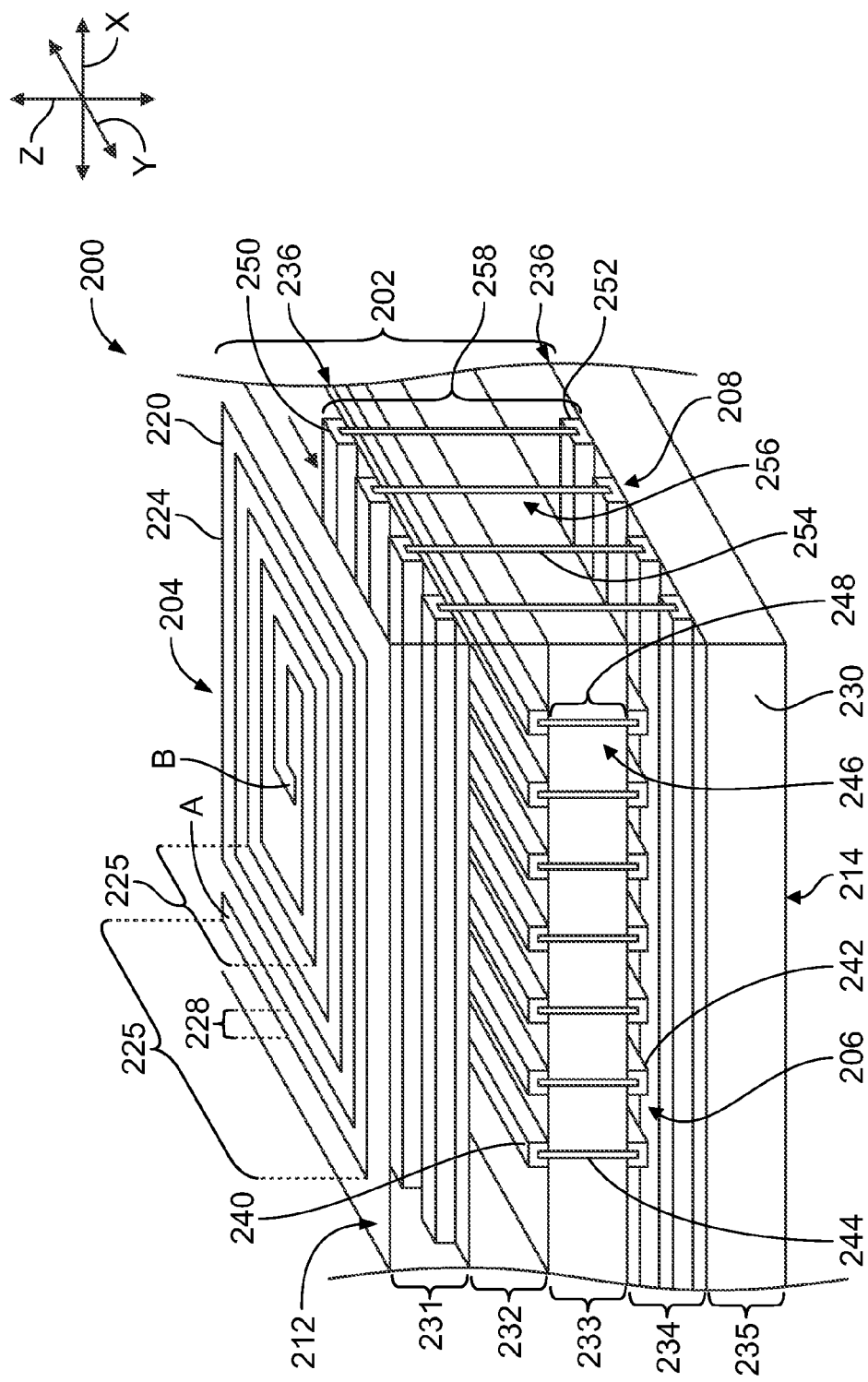
FIG. 2 is a perspective view of a portion of a printed circuit formed in accordance with an embodiment.

FIG. 2 is a perspective view of a portion of a printed circuit 200 formed in accordance with an embodiment. The printed circuit 200 is oriented with respect to mutually perpendicular X-, Y-, and Z-axes. The printed circuit 200 is capable of being used in a power transmitter, in a power receiver, or in both. The power transmitter and power receiver may be similar to the power transmitter 102 and the power receiver 104, respectively, described with respect to FIG. 1. The printed circuit 200 includes, among other things, a stack of substrate layers. For illustrative purposes, the different substrate layers of the printed circuit 200 are not indicated with different hatchings.

The printed circuit 200 has a multi-directional coil assembly 202 that includes a plurality of field coils 204, 206, 208. More specifically, the coil assembly 202 includes a Z-field coil 204, an X-field coil 206, and a Y-field coil 208. The Z-field coil 204 may include one or more conductive elements (e.g., conductive traces) that form a coil having a plurality of windings. Each of the X-field coil 206 and the Y-field coil 208 includes a plurality of interconnected discrete conductive elements (e.g., conductive traces and conductive vias) that collectively form a coil. Each of the Z-field coil 204, the X-field coil 206, and the Y-field coil 208 is configured to generate a corresponding vector component of a magnetic field, and/or have a voltage induced therein by a magnetic field. More specifically, the respective vector components of the magnetic field may induce voltages within the corresponding field coils 204, 206, 208 that create ACs therein.

More specifically, the Z-field coil 204 is configured to generate a Z-component of a magnetic field or have a voltage induced therein by a Z-component of a magnetic field; the X-field coil 206 is configured to generate a X-component of a magnetic field or have a voltage induced therein by a X-component of a magnetic field; and the Y-field coil 208 is configured to generate a Y-component of a magnetic field or have a voltage induced therein by a Y-component of a magnetic field. It should be understood that the term "configured to generate a vector component of a magnetic field or have a voltage induced therein by a vector component of a magnetic field" is not necessarily exclusive. For example, a field coil may be capable of inducing another coil to generate electrical power and having a voltage induced therein by another coil to generate electrical power. Electrical power may be generated using the AC of the induced coil and delivered to a load (not shown), such as a battery or other power-consuming component.

The printed circuit 200 may be manufactured through a variety of fabrication technologies. For example, the printed circuit 200 may be manufactured through known printed circuit board (PCB) technologies. The printed circuit 200 may be a laminate or sandwich structure that includes a plurality of stacked substrate layers. Each substrate layer may include, at least partially, an insulating dielectric material. By way of example, the substrate layers may include a dielectric material (e.g., flame-retardant epoxy-woven glass board (FR4), FR408, polyimide, polyimide glass, polyester, epoxy-aramid, metals, and the like); a bonding material (e.g., acrylic adhesive, modified epoxy, phenolic butyral, pressure-sensitive adhesive (PSA), preimpregnated material, and the like); a conductive material that is disposed, deposited, or etched in a predetermined manner; or a combination of the above. The conductive material may be copper (or a copper-alloy), cupro-nickel, silver epoxy, conductive polymer, and the like. The dielectric material may be rigid or flexible. It should be understood that substrate layers may include sub-layers of, for example, bonding material, conductive material, and/or dielectric material.

In the illustrate embodiment, the printed circuit 200 includes a substrate body 230 having a plurality of substrate layers 231-235 that are stacked along the Z-axis. Each of the substrate layers 231-235 is substantially planar and extends parallel to the X- and Y-axes (or the XY plane). In other embodiments, the printed circuit 200 includes one or more additional substrate layers. It is also contemplated that the printed circuit 200 may include fewer substrate layers than those shown in FIG. 2. A height or thickness of the substrate body 230 is defined between a first outer surface 212 and a second outer surface 214 of the substrate body 230.

Each of the substrate layers 231-235 may extend alongside at least one adjacent substrate layer and define an interface 236 therebetween. For example, the substrate layer 231 and the substrate layer 232 define an interface 236 therebetween. In the illustrated embodiment, the substrate layers 231, 232, 234, and 235 are layers comprising dielectric material that separate conductive elements and the substrate layer 233 is a layer that includes ferromagnetic material. The ferromagnetic material may be selectively deposited within dielectric material of the substrate layer 233 or define an entirety of the substrate layer 233.

In the illustrated embodiment, the printed circuit 200 is a printed circuit board (PCB) in which the substrate layers 231-235 are rigid layers. However, in other embodiments, the printed circuit 200 may be a flexible circuit (or flex circuit) or include one or more flexible layers (e.g., polyimide). In such embodiments, the printed circuit 200 may include one or more rigid layers to impede flexing or bending of the region that includes the coil assembly 202. Alternatively, the printed circuit 200 may have only flexible layers and be sandwiched between two rigid elements to impede flexing or bending of the region that includes the coil assembly 202.

The Z-field coil 204 includes a conductive trace 220 that is coupled to the substrate body 230. The conductive trace 220 extends along a path that is parallel to the XY plane. In some embodiments, the Z-field coil 204 may be disposed along the first outer surface 212 of the printed circuit 200 or disposed closer to the first outer surface 212 than the X-field coil 206 or the Y-field coil 208. For example, in the illustrated embodiment, the conductive trace 220 is coupled to the first outer surface 212. In other embodiments, however, the conductive trace 220 may be formed along one of the interfaces 236 between adjacent substrate layers. In other embodiments, the Z-field coil 204 may be disposed further from the first outer surface 212 than the X-field coil 206 or the Y-field coil 208.

In other embodiments, the printed circuit 200 may include two Z-field coils. For example, the Z-field coil 204 may be a first Z-field coil and the printed circuit 200 may include a second Z-field coil. The second Z-field coil may be coupled to the second outer surface 214 such that the X-field coil 206 and the Y-field coil 208 are positioned between the first and second Z-field coils. The second Z-field coil may be identical to the Z-field coil 204 or have a different configuration.

In some embodiments, the Z-field coil 204 may be characterized as a planar coil. For example, the conductive trace 220 has a plurality of trace segments 225 that are coplanar. More specifically, the conductive trace 220 is on a plane that is parallel to the XY plane. Each trace segment 225 represents a portion of the conductive trace 220. In the illustrated embodiment, each trace segment 225 is linear. However, other trace segments 225 need not be linear in other embodiments.

As shown, the conductive trace 220 forms a plurality of windings 224 that wrap around one another in a spiral-like manner. In the illustrated embodiment, each winding 224 is essentially rectangular or box-shaped. The windings 224 are concentric such that the conductive trace 220 along each winding 224 may surround another winding 224 (if one exists) and may be surrounded by another winding 224 (if one exists). In the illustrated embodiment, the adjacent windings 224 are evenly spaced apart from one another. The conductive trace 200 may have a variety of shapes in other embodiments. For example, the windings 224 may be substantially circular in other embodiments. Moreover, adjacent windings 224 may have different separation distances such that the adjacent windings 224 are not evenly spaced.

The Z-field coil 204 has a variety of parameters or factors that may be configured to obtain the desired field characteristics. For example, the conductive trace 220 has a trace length measured from point A to point B in FIG. 2. The conductive trace 220 also has a trace width 228. In the illustrated embodiment, the trace width 228 is substantially uniform throughout the Z-field coil 204. In other embodiments, the trace width 228 may have different widths along different parts of the trace length. The trace length, the trace width 228, and the path taken by the conductive trace 220 may be configured to obtain the desired field characteristics.

In the illustrated embodiment, the conductive trace 220 forms an entirety of the Z-field coil 204. In other embodiments, however, the conductive trace 220 may form only a portion of the Z-field coil 204. For example, the Z-field coil 204 may include another conductive trace (not shown) located along the interface 236 below the first outer surface 212. The other conductive trace may include one or more windings that are aligned with the windings 224 of the conductive trace 220.

The X-field and Y-field coils 206, 208 are formed from a plurality of conductive traces (referred to as trace segments) and a plurality of conductive paths. For example, the X-field coil 206 includes a first conductor array or series of trace segments 240 that are positioned along the interface 236 between the substrate layer 232 and the substrate layer 233. The X-field coil 206 includes a second array or series of trace segments 242 that are positioned along the interface 236 between the substrate layer 233 and the substrate layer 234. In the illustrated embodiment, the trace segments 240 are coplanar and extend parallel to one another. The trace segments 240 are also linear in a specific embodiment. Similarly, the trace segments 242 are coplanar and extend parallel to one another. The trace segments 242 are also linear in a specific embodiment. The trace segments 240, 242 may extend essentially parallel to the Y-axis. As used herein, the term "essentially parallel" means that the trace segments 240, 242 may form an angle that is at most +/−20° with respect to a plane formed by the Y- and Z-axes (or the YZ plane). In particular embodiments, the trace segments 240, 242 may form an angle that is at most +/−15° with respect to the YZ plane or at most +/−10°. In more particular embodiments, the trace segments 240, 242 may form an angle that is at most +/−5° with respect to the YZ plane or at most +/−3°.

The trace segments 240 and the trace segments 242 are positioned along separate planes that are oriented parallel to each other and parallel to the XY plane. The trace segments 240, 242 are separated by one or more of the substrate layers 231-235 according to various specific embodiments. In an exemplary embodiment, each of the trace segments 240 is interconnected to one or two of the trace segments 242 through corresponding conductive vias 244. Similarly, each of the trace segments 242 is directly coupled to one or two of the trace segments 240 through corresponding vias 244.

The conductive vias 244 extend parallel to the Z-axis through the substrate layer 233. Collectively, the trace segments 240, 242 and the conductive vias 244 form the X-field coil 206. More specifically, the trace segments 240, 242 and the conductive vias 244 form a plurality of windings 246 that are in series with one another and wrap about a core region 248. The core region 248 represents the volume of material, which may be ferromagnetic in some embodiments, that is surrounded by the windings 246. The windings 246 are spaced apart from each other along the X-axis.

The Y-field coil 208 includes a first array or series of trace segments 250 that are positioned along the interface 236 between the substrate layer 231 and the substrate layer 232. The Y-field coil 208 includes a second array or series of trace segments 252 that are positioned along the interface 236 between the substrate layer 234 and the substrate layer 235. In the illustrated embodiment, the trace segments 250 are coplanar and extend parallel to one another. The trace segments 250 are also linear in a specific embodiment. Similarly, the trace segments 252 are coplanar and extend parallel to one another. The trace segments 252 are also linear in a specific embodiment. The trace segments 250, 252 may extend essentially parallel to the X-axis. As used herein, the term "essentially parallel" means that the trace segments 250, 252 may form an angle that is at most +/−20° with respect to a plane formed by the X- and Z-axes (or the XZ plane). In particular embodiments, the trace segments 250, 252 may form an angle that is at most +/−15° with respect to the XZ plane or at most +/−10°. In more particular embodiments, the trace segments 250, 252 may form an angle that is at most +/−5° with respect to the XZ plane or at most +/−3°.

The trace segments 250 and the trace segments 252 are positioned along separate planes that are oriented parallel to each other and parallel to the XY plane. The trace segments 250, 252 are separated by one or more of the substrate layers 231-235 according to various specific embodiments. In an exemplary embodiment, each of the trace segments 250 is interconnected to one or two of the trace segments 252 through corresponding conductive vias 254. The conductive vias 254 extend parallel to the Z-axis through the substrate layers 232-234. Collectively, the trace segments 250, 252 and the conductive vias 254 form the Y-field coil 208. More specifically, the trace segments 250, 252 and the conductive vias 254 form a plurality of windings 256 that are in series with one another and wrap about a core region 258. The core region 258 represents the volume of material, which may be ferromagnetic in some embodiments, that is surrounded by the windings 256. The windings 256 are spaced apart from each other along the Y-axis.

As shown in a specific embodiment, the X-field coil 206 is positioned within the core region 258 of the Y-field coil 208 such that the windings 256 of the Y-field coil 208 wrap around the X-field coil 206. In other embodiments, the Y-field coil 208 may be positioned within the core region 248 of the X-field coil 206 such that the windings 246 of the X-field coil 206 wrap around the Y-field coil 208. In such embodiments, the trace segments 240 and the trace segments 242 would be further spaced apart than shown in FIG. 2.

In the illustrated embodiment, the trace segments 240, 242, 250, 252 are located at different depths of the substrate body 230. It is contemplated, however, that one or more ore of the trace segments 240, 242, 250, 252 may be located at a common depth with each other or located at a common depth with respect to the Z-field coil 204. For example, the number of windings of the Z-field coil 204 may be reduced to allow the trace segments 250 or the trace segments 240 to extend along the outer surface 212.

The ferromagnetic material (e.g., ferrite) of the substrate layer 233 is configured to provide electromagnetic shielding between portions of the X-field coil 206 and the Y-field coil 208 to avoid electromagnetic cancellation of fields. In some embodiments, the ferromagnetic material is selectively deposited such that the ferromagnetic material is located within the core region 248 of the X-field coil 206 and/or the core region 258 of the Y-field coil 208, but not in other portions of the substrate layer 233. In other embodiments, the ferromagnetic material may be located within the core region 248 and also portions of the substrate layer 233 that extend beyond the core region 248. For example, an entirety of the substrate layer 233 may be ferromagnetic material. In some embodiments, the ferromagnetic material may be selectively deposited within other substrate layers to provide electromagnetic shielding.

The conductive vias 244 and 254 may extend directly through the ferromagnetic material and dielectric material of the substrate layers 232-234. During manufacturing of the printed circuit 200, the trace segments 240, 242 may be provided to opposite sides of an isolated layer of dielectric material. This isolated layer will eventually become the substrate layer 233. Before or after the trace segments 240, 242 are provided, holes may be drilled through the dielectric layer. The holes may be filled with conductive material to provide the conductive vias 244 and the substrate layer 233. The substrate layer 233 may then be sandwiched between the dielectric layers that eventually become the substrate layers 232, 234. The sandwiching operation may be performed using, for example, heat, pressure, and/or one or more bonding materials. The resulting composite structure of substrate layers 232-234 may then have the trace segments 250, 252 added to opposite sides of the composite structure and holes drilled through the composite structure. The holes of the composite structure may be filled to provide the conductive vias 254. The substrate layers 231 and 235 may then be added to provide the substrate body 230.

In other embodiments, the conductive traces may be deposited along an exterior edge (or edges) of the substrate layer (or layers). For example, the conductive vias 244 may be replaced with outer conductive traces that extend along an exterior of the substrate layer 233. In other embodiments, the printed circuit 200 may include the conductive vias 244 and also outer conductive traces that extend along the exterior of the substrate layer 233. In the description and claims, the conductive vias and the outer conductive traces may referred to generally as "conductive paths." It is noted that the conductive traces along the exterior of the substrate layer(s) may not be parallel to the Z-axis. For example, the conductive traces may be only substantially parallel to the Z-axis, such as +/−10°.

In the illustrated embodiment, the multi-directional coil assembly 202 includes both the X-field coil 206 and the Y-field coil 208, which may also be referred to as secondary field coils. The secondary field coils 206, 208 are labeled as X- and Y-, respectively, to distinguish the secondary field coils 206, 208 from each other. For embodiments that include only one secondary field coil, the label "X-field" or "Y-field" does not limit the secondary coil to a designated orientation other than the secondary coil being effectively orthogonal to the Z-field coil. In some embodiments, the coil assembly 202 may include the X-field coil 206 and the Y-field coil 208, but not include the Z-field coil 204.

The coil assembly 202 may be communicatively coupled to control circuitry (not shown). For example, if the coil assembly 202 is disposed within a receiving device, such as the power receiver 104 (FIG. 1), the control circuitry may include a power conversion unit and a communications/control unit (not shown), such as the power conversion unit 124 and the communications/control unit 126 shown in FIG. 1. The control circuitry may cooperate with a power transmitter to selectively control an amount of electrical power provided to the field coils. Likewise, if the coil assembly 202 is disposed within a power transmitter, such as the power transmitter 102 (FIG. 1), the control circuitry may include a power conversion unit and a communications/control unit (not shown), such as the power conversion unit 124 and the communications/control unit 126 shown in FIG. 1. The control circuitry may selectively control the field coils.

In some embodiments, the control circuitry is formed at least partially from the printed circuit 200 and/or is mounted to the printed circuit 200. The control circuitry (or elements thereof) may be secured directly to at least one of the first or second outer surfaces 212, 214. The control circuitry may also be coupled to the printed circuit 200 such that the control circuitry has a fixed position relative to the printed circuit 200. In other embodiments, the control circuitry may not have a fixed position relative to the printed circuit 200, but may be communicatively coupled to the coil assembly 202. For example, the coil assembly 202 may be communicatively coupled to the control circuitry through one or more flex layers having conductive traces.

In some embodiments, at least two of the Z-field coil 204, the X-field coil 206, and the Y-field coil 208 are in series. For example, the Z-field coil 204 may be in series with the X-field coil 206, and the X-field coil 206 may be in series with the Y-field coil 208. In other embodiments, the Z-field coil 204, the X-field coil 206, and the Y-field coil 208 are not in series. In such embodiments, the control circuitry may control each of the Z-field coil 204, the X-field coil 206, and the Y-field coil 208 independently from the others.

FIG. 3 is an isolated plan view of a secondary field coil 300 in accordance with an embodiment. In the illustrated embodiment, the secondary field coil 300 is an X-field coil, such as the X-field coil 206 (FIG. 2), but the secondary field coil 300 may also be configured to function as a Y-field coil, such as the Y-field coil 208 (FIG. 2). As shown, the secondary field coil 300 includes a first conductor array 302 of conductive trace segments 304 and a second conductor array 306 of conductive trace segments 308. The trace segments 304, 308 are configured to be coupled to a substrate body (not shown) and extend parallel to an XY plane. In the illustrated embodiment, the trace segments 308 are dashed to indicate that the trace segments 308 are positioned below the trace segments 304.

The secondary field coil 300 includes conductive vias 310, 311. Each conductive via 310 interconnects one trace segment 304 to one trace segment 308. Each conductive via 311 also interconnects one trace segment 304 to one trace segment 308. The conductive vias 310, 311 may extend parallel to the Z-axis through at least one of the substrate layers (not shown) of the substrate body that separate the first and second conductor arrays 302, 306. In other embodiments, one or more of the conductive vias 310, 311 may be replaced with an outer conductive trace that extends along an edge (or edges) of the substrate layer (or layers).

As shown, the trace segments 304 are oriented at an angle $\theta_1$ with respect to the YZ plane, and the trace segments 308 are oriented at an angle $\theta_2$ with respect to the YZ plane. An absolute value of the angles $\theta_1$, $\theta_2$ may be equal to each other, but the angles $\theta_1$, $\theta_2$ may have opposite signs. For example, the angle $\theta_1$ may be a positive 5°, and the angle $\theta_2$ may be a negative 5° (or) −5°. In other embodiments, the absolute value of the angles $\theta_1$, $\theta_2$ are not equal to each other. For example, the angle $\theta_1$ may be 0°, and the angle $\theta_2$ may be −10°.

As such, the secondary field coil 300 forms a plurality of windings 312 in which each winding 312 includes a trace segment 304, a conductive via 310, a trace segment 306, and a conductive via 311. The last winding 312 may not include a conductive via 310 or, alternatively, a conductive via 311. The plurality of windings 312 may form a helical structure. When AC flows through the secondary field coil 300, a magnetic field $B_X$ is generated. In other embodiments, the secondary field coil 300 may have a voltage induced therein by a vector component of a magnetic field.

FIG. 4 is an isolated plan view of a field coil 350 in accordance with an embodiment. In the illustrated embodiment, the secondary field coil 350 is an X-field coil, such as the X-field coil 206 (FIG. 2), but the secondary field coil 300 may also be configured to function as a Y-field coil, such as the Y-field coil 208 (FIG. 2). As shown, the secondary field coil 350 includes a first conductor array 352 of conductive trace segments 354 and a second conductor array 356 of conductive trace segments 358. The trace segments 354, 358 are coupled to a substrate body (not shown) and parallel to an XY plane. In the illustrated embodiment, the trace segments 358 are dashed to indicate that the trace segments 358 are positioned below the trace segments 354.

The secondary field coil 350 includes conductive vias 360 in which each conductive via 360 interconnects one trace segment 354 to one trace segment 358. The secondary field coil 350 also includes conductive vias 361 in which each conductive via 361 interconnects one trace segment 354 to one trace segment 358. The conductive vias 360, 361 may extend parallel to the Z-axis through at least one of the substrate layers (not shown) of the substrate body that separate the first and second conductor arrays 352, 356.

Unlike the secondary field coil 300 (FIG. 3), the trace segments 354 and the trace segments 358 extend parallel to the YZ plane. Windings 362 of the secondary field coil 350 are spaced apart from each other along the X-axis by trace joints 364, 365. The trace joint 364 is coplanar with the trace segments 358 and joins a corresponding conductive via 360 to a corresponding trace segment 358. The trace joint 365 is coplanar with the trace segments 354 and joins a corresponding conductive via 361 to a corresponding trace segment 354. Each of the windings 362 may include a trace segment 354, a trace joint 365, a conductive via 361, a trace segment 358, a trace joint 364, and a conductive via 360. The last winding 362 may not include a conductive via 360 or, alternatively, a conductive via 361. As shown, adjacent trace segments 354 are separated by a gap 366, and adjacent trace segments 358 are separated by a gap 368. The gaps 366, 368 may have smaller or larger sizes than those shown in FIG. 4. As described herein, one or more of the conductive vias 360, 361 may be replaced with an outer conductive trace.

Figure 5:
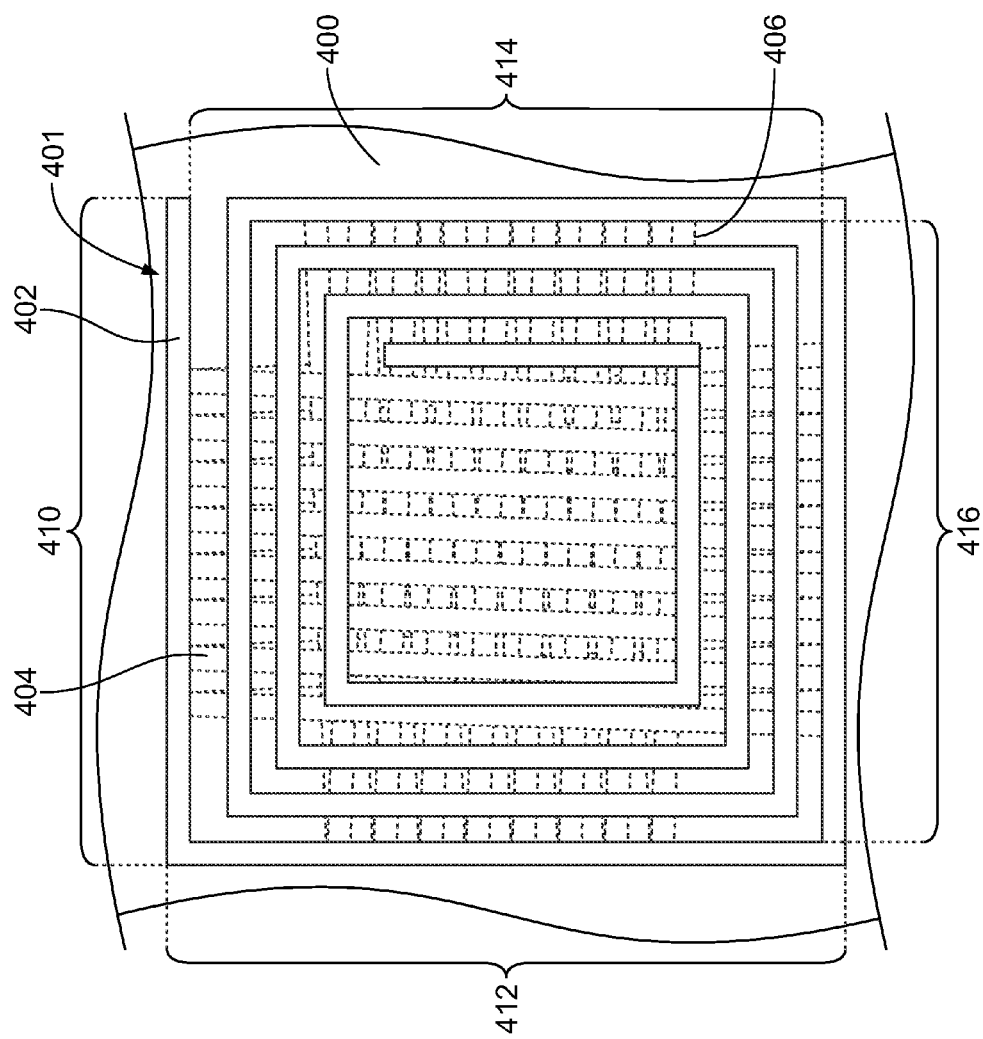
FIG. 5 is a plan view of a coil assembly in accordance with an embodiment that may be used with the printed circuit of FIG. 2.

FIG. 5 is a plan view of a printed circuit 400 having a multi-directional coil assembly 401 in accordance with an embodiment. The printed circuit 400 may be similar or identical to the printed circuit 200, and the coil assembly 401 may be similar or identical to the coil assembly 202. As shown, the coil assembly 401 includes a Z-field coil 402, an X-field coil 404, and a Y-field coil 406. The X-field coil 404 and the Y-field coil 406 are distinguished by different dashed lines. In other embodiments, the coil assembly 401 includes only two of the Z-field coil 402, the X-field coil 404, or the Y-field coil 406.

The coil assembly 401 may occupy a three-dimensional (3D) space that is substantially defined by an X-dimension (or first dimension) 410 of the Z-field coil 402 and a Y-dimension (or second dimension) 412 of the Z-field coil 402. Such embodiments may facilitate positioning an array of coil assemblies 401 within the same printed circuit 400. A Z-dimension (or third dimension) (not indicated) of the coil assembly 401 may be determined by a depth of either a second Z-field coil (not shown) or a bottom conductor array (not shown) of the X-field coil 404 or the Y-field coil 406. In other embodiments, a width 414 of the X-field coil 404 and/or a width 416 of the Y-field coil 406 may be greater than the corresponding dimension of the Z-field coil 402. In such embodiments, the coil assembly 401 may occupy a three-dimensional (3D) space that is substantially defined by the width 414 and/or the width 416.

Figure 6:
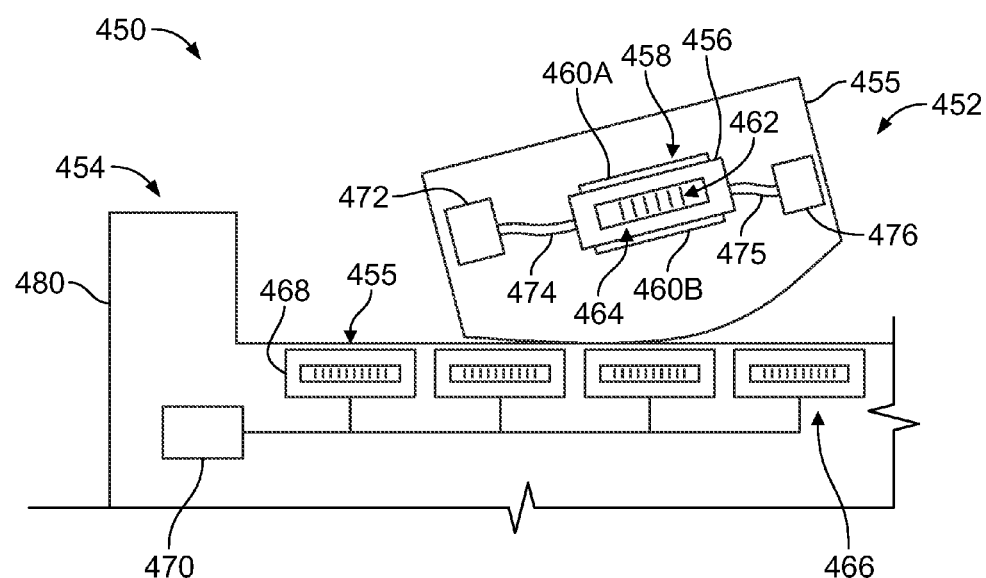
FIG. 6 illustrates a WPT system formed in accordance with an embodiment that includes a base station and a receiving device.

FIG. 6 illustrates a WPT system 450 formed in accordance with an embodiment that includes a receiving device 452 and a base station 454. The WPT system 450 may be similar or identical to the WPT system 100, wherein the receiving device 452 is similar or identical to the power receiver 104 (FIG. 1) and the base station 454 is similar or identical to the power transmitter 102 (FIG. 1). The base station 454 includes a station housing 480 and a coil array 466 of multi-directional coil assemblies 468 held by the station housing 480. The coil assemblies 468 may be similar or identical to the coil assemblies 202 (FIG. 2). Alternatively, the coil assemblies 468 may be planar coils. The coil array 466 is configured to generate a magnetic field for charging the receiving device 452. The base station 454 has a charging surface 455 that is configured to support the receiving device 452 thereon. The coil assemblies 468 are operably coupled to control circuitry 470. The control circuitry 470 may include one or more WPT units, such as the WPT unit 112 (FIG. 1).

The receiving device 452 includes a device housing 455 and a printed circuit 456 having a multi-directional coil assembly 458 that is coupled to the device housing 455. The coil assembly 458 includes first and second Z-field coils 460A, 460B, an X-field coil 462, and a Y-field coil 464. In other embodiments, however, the coil assembly 458 may include only one of the X-field coil 462 and the Y-field coil 464. The printed circuit 456 may be similar or identical to the printed circuit 200 (FIG. 2). Also shown, a portion of the printed circuit 456 is defined by a flexible layer 474 that interconnects the coil assembly 458 to a control circuitry 472 and a flexible layer 475 that interconnects the coil assembly 458 to a load 476. For example, the flexible layer may include conductive traces that electrically couple the control circuitry 472 to the coil assembly 458. The flexible layers 474, 475 may also include one or more the trace segments of the X-field coil 462 or the Y-field coil 464 or one or more of the conductive vias of the X-field coil 462 or the Y-field coil 464.

As shown in FIG. 6, the receiving device 452 is positioned on the charging surface 455 such that none of the Z-field coils 460A, 460B, the X-field coil 462, and the Y-field coil 464 extends parallel to the charging surface 455. During operation a magnetic field generated by the coil array 466 may include vector components (e.g., X-component, Y-component, and Z-component). The Z-field coils 460A, 460B may have voltages induced therein by the Z-component of the magnetic field, the X-field coil 462 may have a voltage induced therein by the X-component of the magnetic field, and the Y-field coil 464 may have a voltage induced therein by the Y-component of the magnetic field. Electrical power generated by the coil assembly 458 may be provided to a load (not shown), such as a battery. Accordingly, although the coil assembly 458 may not have an ideal orientation with respect to the coil array 466 or the coil assemblies 468, the coil assembly 458 may be able to generate power from the vector components of the magnetic field.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The patentable scope should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A printed circuit comprising:
   a substrate body comprising a plurality of substrate layers stacked along a Z-axis, each substrate layer being substantially planar and extending along X- and Y-axes, wherein the X-, Y-, and Z-axes are mutually perpendicular;
   a Z-field coil coupled to the substrate body and comprising a conductive trace that is parallel to an XY plane; and
   an X-field coil comprising conductive trace segments that are coupled to the substrate body and parallel to the XY plane, the X-field coil including conductive paths that extend substantially parallel to the Z-axis, the conductive paths interconnecting the trace segments to form the X-field coil;
   wherein the Z-field coil and the X-field coil are configured to generate respective vector components of a magnetic field or have respective voltages induced therein by a magnetic field.

2. The printed circuit of claim 1, further comprising a Y-field coil including conductive trace segments that are coupled to the substrate body and parallel to the XY plane, the conductive trace segments of the Y-field coil being parallel to the Y-axis and the conductive trace segments of the X-field coil being parallel to the X-axis, the Y-field coil including conductive paths that extend substantially parallel to the Z-axis and interconnect the trace segments of the Y-field coil to form the Y-field coil, wherein the Y-field coil is configured to generate a respective vector component of the corresponding magnetic field or have a voltage induced therein by the corresponding magnetic field.

3. The printed circuit of claim 2, wherein the Y-field coil includes a plurality of windings that wrap around a core region of the Y-field coil, the X-field coil being disposed within the core region.

4. The printed circuit of claim 1, wherein at least one of the substrate layers comprises a ferromagnetic material.

5. The printed circuit of claim 4, wherein the X-field coil has a plurality of windings that wrap around the ferromagnetic material.

6. The printed circuit of claim 4, wherein the conductive paths of the X-field coil extend directly through the ferromagnetic material.

7. The printed circuit of claim 1, wherein the X-field coil comprises first and second conductor arrays, each of the first and second conductor arrays including a plurality of the trace segments of the X-field coil, the trace segments of the first conductor array being coplanar and the trace segments of the second conductor array being coplanar, the first and second conductor arrays being separated by one or more of the substrate layers and being electrically coupled by the corresponding conductive paths of the X-field coil.

8. The printed circuit of claim 1, wherein the Z-field coil includes a plurality of windings that wrap around one another in a spiral-like manner and are co-planar.

9. The printed circuit of claim 1, wherein the Z-field coil is disposed along an outer surface of the printed circuit or disposed closer to the outer surface than the X-field coil.

10. The printed circuit of claim 1, wherein one or more of the substrate layers are flexible layers.

11. A receiving device comprising:
a device housing;
a load coupled to the device housing and configured to receive electrical power;
a printed circuit coupled to the device housing and configured to provide the electrical power to the load, the printed circuit comprising:
a substrate body comprising a plurality of substrate layers stacked along a Z-axis, each substrate layer being substantially planar and extending along X- and Y-axes, wherein the X-, Y-, and Z-axes are mutually perpendicular;
a Z-field coil coupled to the substrate body and comprising a conductive trace that is parallel to an XY plane; and
an X-field coil comprising conductive trace segments that are coupled to the substrate body and parallel to the XY plane, the X-field coil including conductive paths that extend substantially parallel to the Z-axis, the conductive paths interconnecting the trace segments to form the X-field coil;
wherein the Z-field coil and the X-field coil are configured to have voltages induced therein by a magnetic field for generating the electrical power.

12. The receiving device of claim 11, further comprising a Y-field coil including conductive trace segments that are coupled to the substrate body and parallel to the XY plane, the conductive trace segments of the Y-field coil being parallel to the Y-axis and the conductive trace segments of the X-field coil being parallel to the X-axis, the Y-field coil including conductive paths that extend substantially parallel to the Z-axis and interconnect the trace segments of the Y-field coil to form the Y-field coil, wherein the Y-field coil is configured to have a voltage induced therein by the magnetic field.

13. The receiving device of claim 12, wherein the Y-field coil includes a plurality of windings that wrap around a core region of the Y-field coil, the X-field coil being disposed within the core region.

14. The receiving device of claim 11, wherein at least one of the substrate layers comprises ferromagnetic material, the X-field coil having a plurality of windings that wrap around a core region of the X-field coil, wherein the ferromagnetic material is disposed within the core region of the X-field coil.

15. The receiving device of claim 11, wherein the X-field coil comprises first and second conductor arrays, each of the first and second conductor arrays including a plurality of the trace segments of the X-field coil, the trace segments of the first conductor array being coplanar and the trace segments of the second conductor array being coplanar, the first and second conductor arrays being separated by one or more of the substrate layers and being electrically coupled by the corresponding conductive paths of the X-field coil.

16. The receiving device of claim 11, further comprising control circuitry for communicating with a base station to communicate a charge status to the base station.

17. The receiving device of claim 11, wherein one or more of the substrate layers are flexible layers.

18. A base station comprising:
a station housing having a charging surface;
a printed circuit positioned proximate to the charging surface, the printed circuit comprising:
a substrate body comprising a plurality of substrate layers stacked along a Z-axis, each substrate layer being substantially planar and extending along X- and Y-axes, wherein the X-, Y-, and Z-axes are mutually perpendicular;
a Z-field coil coupled to the substrate body and comprising a conductive trace that is parallel to an XY plane; and
an X-field coil comprising conductive trace segments that are coupled to the substrate body and parallel to the XY plane, the X-field coil including conductive paths that extend substantially parallel to the Z-axis, the conductive paths interconnecting the trace segments to form the X-field coil;
wherein the Z-field coil and the X-field coil are configured to generate respective vector components of a magnetic field for generating electrical power in a receiving device.

19. The base station of claim 18, further comprising a Y-field coil including conductive trace segments that are coupled to the substrate body and parallel to the XY plane, the conductive trace segments of the Y-field coil being parallel to the Y-axis and the conductive trace segments of the X-field coil being parallel to the X-axis, the Y-field coil including conductive paths that extend substantially parallel to the Z-axis and interconnect the trace segments of the Y-field coil to form the Y-field coil, wherein the Y-field coil is configured to generate a respective vector component of the magnetic field for generating electrical power in the receiving device.

20. The base station of claim 18, further comprising control circuitry for communicating with the receiving device and controlling an amount of electrical power that is transferred to the receiving device, the control circuitry selectively controlling an amount of current provided to each of the Z-field coil and the X-field coil.

\* \* \* \* \*